US008115629B2

(12) United States Patent
Zhu et al.

(10) Patent No.: US 8,115,629 B2
(45) Date of Patent: Feb. 14, 2012

(54) COLLECTIVE OBJECTS MANAGEMENT SYSTEM USING R.F. OBJECT IDENTIFICATION WITH MULTIPLE CRYSTALS

(75) Inventors: Shengbo Zhu, San Jose, CA (US); Su Shiong Huarg, Bellevue, WA (US)

(73) Assignee: Microdata Corporation, San Jose, CA (US)

( * ) Notice: Subject to any disclaimer, the term of this patent is extended or adjusted under 35 U.S.C. 154(b) by 342 days.

(21) Appl. No.: 12/586,552

(22) Filed: Sep. 24, 2009

(65) Prior Publication Data

US 2011/0068914 A1    Mar. 24, 2011

(51) Int. Cl.
    *G08B 13/14*    (2006.01)
(52) U.S. Cl. .................... 340/570; 340/568.1; 340/568.2
(58) Field of Classification Search ............... 340/568.1, 340/568.2, 570, 571, 572.1, 572.3, 572.4; 235/385, 441; 361/760, 782
    See application file for complete search history.

(56) References Cited

U.S. PATENT DOCUMENTS

| | | | | |
|---|---|---|---|---|
| 5,455,409 A * | 10/1995 | Smith et al. | .................... | 235/385 |
| 5,721,531 A * | 2/1998 | Garver et al. | ................... | 340/8.1 |
| 5,739,765 A * | 4/1998 | Stanfield et al. | ............... | 340/8.1 |
| 5,751,221 A * | 5/1998 | Stanfield et al. | ............. | 340/5.74 |
| 5,977,875 A * | 11/1999 | Lin et al. | ....................... | 340/570 |
| 6,348,864 B1 * | 2/2002 | Lin et al. | ....................... | 340/570 |
| 6,664,895 B2 * | 12/2003 | Zhu | ................................ | 340/570 |
| 7,304,857 B2 * | 12/2007 | Yamashita | .................... | 361/760 |
| 7,663,893 B2 * | 2/2010 | Yamashita | .................... | 361/782 |

* cited by examiner

*Primary Examiner* — Van T. Trieu

(57) ABSTRACT

A collective objects management system for objects such as documents contained in file folders in drawers of file cabinets. Each file folder has an electrical circuit with a visible indicator mounted on the file folder. Each folder circuit has a pair of crystals which are responsive to R.F. signals of specific frequencies, the frequencies of each pair being different for each folder circuit. An associated computer operates an R.F. signal generator to produce R.F. signals at the frequencies of the particular folder circuit of the file folder selected for retrieval. To aid the user, each file drawer has a visible indicator mounted on the front panel, the panel indicator being illuminated when the sought folder is contained in that drawer. The invention can be applied to a wide variety of collective objects management systems, such as supermarkets, automobile parts distributors, and various manufacturing operations.

18 Claims, 9 Drawing Sheets

COLLECTIVE OBJECTS MANAGEMENT SYSTEM USING R.F. OBJECT IDENTIFICATION WITH MULTIPLE CRYSTALS

BACKGROUND OF THE INVENTION

This invention relates to collective objects management systems in general, and in particular to an improved collective objects management system using R.F. object identification with multiple crystals.

The term "collective objects management systems" is a term coined to denote systems for generally keeping track of items ("objects") in a collection of items. For example, an automobile parts warehouse at any given time has a collection of vehicle parts ("objects") in inventory. The kind and number of such parts varies every day, as parts are sold and new parts are received. In order to keep track of the number and kind of vehicle parts in inventory, some type of collective vehicle parts management system must be used. Similarly, in a semiconductor manufacturing operation, at any given time there is a collection of integrated circuits ("objects") of one or more types located somewhere in the facility, which must be accounted for using a collective integrated circuits management system. In supermarkets, a collection of a large number of different types of items, such as meats, produce, canned goods and the like is usually in inventory, with the number and types of objects varying widely on a daily basis and thus requiring a complex objects management system. In business offices and some homes, file storage cabinets are typically used to store documents used for both business and personal activities. A typical file storage cabinet has several pull-out drawers each containing a relatively large number of file folders ("objects"), with each folder containing one or more documents. In order to enable the documents contained in the various files to be readily accessed, some type of file management system is necessary.

In the case of file storage management, each file folder is typically provided with a tab portion visible when the file drawer is opened (usually along the upper edge of the folder) and containing readable information describing the content of the folder. The readable information is typically a short form of identification, such as an account name, a subject name (e.g., "Utilities Bills") or the like.

In order to provide ready access to the individual documents contained in the folders, some type of indexing arrangement is normally used to identify the drawer location of each folder. A simple technique commonly employed is an alphabetical index card placed on the front panel of each drawer listing the file folders in alphabetical order. For example, one file drawer panel might have an index card listing files starting with the letters A-F, another drawer might have an index card listing files starting with the letters G-L, etc. Frequently, more sophisticated indexing arrangements are used, such as a computer-based index listing all files by a short form identifier and a corresponding enlarged and more thorough description of the file contents. Even such computer-based arrangements still require the use of a readable tab or tag on each file folder in order to identify a given folder to a user. This is highly undesirable, since it facilitates the search by any unauthorized user for a specific file name or for a file containing information of a particular type. Nevertheless, known file management systems require the use of visible tabs or tags in order for the files to be reasonably locatable.

In those applications in which several individuals have access to the file drawer contents, some arrangement is usually made to monitor the disposition of the files. For example, in a business application, it is convenient and sometimes necessary to provide a sign out and return procedure so that the whereabouts of a given file will always be known. Usually, such monitoring attempts fail to accurately track the files because of the failure of individuals to faithfully follow the procedure. Consequently, at any given time, the integrity of the file management system can only be verified by actually looking through each file drawer and checking the file folders and their contents with the master index. This requirement is both time-consuming and burdensome, and thus a severe disadvantage.

In known file management systems of the type described above, once a file folder is provided with a contents identifier, that folder is permanently associated with the nature of its contents. To change the contents to some other category, the folder must either be thrown away and a new, unmarked folder substituted in its place, or the identification label must be changed. In addition, the master index must be up-dated, either manually or by using the computer in a computer-based indexing system. These procedures are not always followed by office personnel, and the integrity of the file system is consequently compromised.

In all examples of known collective objects management systems, either the containers for the different objects or the objects themselves are usually provided with some type of human readable or machine readable identification indicia, such as a label or tag affixed to the object or the container. In more sophisticated systems, a computer is used to assist in keeping track of the objects. When an object is removed from the usual location, some procedure is typically used to note the fact that that object has been removed from its normal location. This is accomplished either by operator entry of the change into the system computer, or by using tag or label reading devices (e.g., bar code readers) to enter the information into the system computer.

U.S. Pat. No. 5,977,875 issued Nov. 2, 1999 for "Collective Objects Management System Using R.F. Object Identification", the disclosure of which is hereby incorporated by reference, discloses a collective objects management system which eliminates the disadvantages noted above with file management systems. In addition, the collective objects management system disclosed in the '875 U.S. patent provides a simple and efficient way to find a desired object stored somewhere in a large collection of different objects. The system disclosed in the '875 U.S. patent uses R.F. sensitive circuits to maintain control of all objects in a collection. Each object has an associated R.F. sensitive circuit which resonates at a unique frequency when an R.F. signal at that unique frequency is received by the circuit, and an indicator coupled to the R.F. circuit for identifying the object to a human operator. The indicator is preferably a visible indicator—such as an LED—coupled to the object or the container for the object and which can readily be seen by a human operator. Alternatively, an audible indicator—such as a buzzer—can be used.

In a specific implementation of the invention in a file management system, a folder circuit is included in each file folder to be placed in a file drawer. Each folder circuit has a crystal responsive to a particular R.F. frequency, with the resonant frequency of a given crystal different from all the other crystals. Each folder circuit is electrically coupled to a drawer signal input/output using the electrically conductive upper support rails usually found in conventional file cabinets. One of the rails is modified by electrically isolating that rail from the remaining electrically conductive elements in the drawer.

Each folder circuit includes an indicator, preferably an LED visible indicator, mounted along the upper margin of the folder in a location visible to a user when the drawer is opened. In addition, each drawer is provided with an indicator, preferably a flashing LED visible indicator, mounted on the front panel of the drawer. A current detector circuit is used to control the state of the drawer panel indicator.

All drawer input/output terminals are electrically coupled in parallel to an associated computer, either using dedicated connectors (i.e., hard wired) or transceivers (i.e., wireless communication). The computer includes an R.F. signal generator capable of generating signals matching all the crystal frequencies. To find a file, a user specifies that file to the computer, typically by using a keyboard or a mouse. The computer causes the R.F. signal generator to generate an R.F. signal whose frequency matches that of the specified file. The R.F. signal is transmitted to all the file cabinets in the system, and thus to all the file drawers. If the specified file is located in any one of the drawers, the indicator on the front panel of the drawer containing that file folder, and the indicator of the correct file folder, are both activated. The user then opens the drawer with the active panel indicator and removes the file folder with the active file folder indicator.

As applied to a file management system, the collective objects management system disclosed in the '875 U.S. Patent eliminates the need for readable tabs or tags on each file folder, since the correct file folder is designated by the activated indicator. Also, the nature of a file folder can be changed by simply entering the necessary information into the computer. In addition, the integrity of the entire file system can be checked by using an R.F. sweep frequency generator to sweep the entire frequency range of crystal frequencies and detecting any frequency for which a resonant response is absent. The system can be readily and conveniently incorporated into existing file cabinets having the electrically conductive dual rail folder support mechanism. For other types of collective objects management systems, such as auto parts warehouses and integrated circuit manufacturing operations, the system can be implemented using standard object containers of known design.

As noted above, in the '875 system each object has an associated R.F. sensitive circuit having a single crystal which resonates at a unique frequency when an R.F. signal at that unique frequency is received by the circuit. This arrangement provides a unique one-to-one correspondence between an object and a given frequency. In a collective objects management system having a large number of objects, such as some file management systems have a large number of files, a correspondingly large number of crystals each having a resonant frequency different from all the other crystals is required. In order to guard against incorrect crystal activation it has been found useful to impose a minimum frequency separation between all crystals in the collection of crystals in the system. For example, in a system designed to operate over a frequency range of about 2 to about 20 mHz., a minimum crystal frequency separation of 1 kHz has been found to provide good results. The minimum frequency separation requirement, however, imposes an upper limit on the total number of crystals which can be used in the system, which places an upper limit on the total number of objects which can be accommodated by the system.

SUMMARY OF THE INVENTION

The invention comprises a collective objects management system which is devoid of the above-noted limitation.

In a broadest aspect the invention comprises a collective objects management system including a receptacle for a plurality of objects, the receptacle having a pair of electrically conductive members; a pair of electrically conductive signal leads coupled to the pair of electrically conductive members; and a plurality of r.f. circuits each associated to a different one of the objects, each of the plurality of r.f. circuits having a pair of electrically conductive terminals in electrical contact with the electrically conductive members when the associated object is located in the receptacle, at least two crystals each resonant at a specific frequency and an indicator activated whenever the associated crystals detect r.f. signals at the specific frequencies of those at least two crystals, the resonant frequencies of the at least two crystals in each r.f. circuit being different from the resonant frequencies of the at least two crystals in the other r.f. circuits so that r.f. signals applied to the pair of electrically conductive signal leads cause the at least two crystals in only one of the r.f. circuits to resonate and only the associated indicator to be activated.

The indicator is preferably a visible indicator, such as an LED.

The invention may further include a current detector electrically coupled to the pair of electrically conductive members in the receptacle for detecting resonance of the at least two crystals in any of the r.f. circuits in the receptacle, and an additional indicator coupled to and activated by the current detector for signifying that at least two crystals in one of the r.f. circuits in the receptacle are at resonance. The additional indicator is preferably a visible indicator, such as an LED.

In some embodiments, the receptacle has a front panel; and the additional indicator is located on the front panel.

In a specific implementation of the invention to a file management system, the receptacle comprises a cabinet file drawer; the pair of electrically conductive members comprise file folder support rails in the drawer; and each of the plurality of r.f. circuits is carried by a different one of a corresponding plurality of file folders, each of the file folders having a pair of electrically conductive support arms arranged to engage the support rails so as to be removably supported thereby. In this implementation, each file folder has an upper margin; and the indicators are located adjacent the upper margin. The invention can be expanded to accommodate a system for managing objects distributed in an object location space, the system having a plurality of receptacles for a plurality of objects, with each of the receptacles including the basic elements noted above. When implemented in a file management system, a plurality of file cabinets is used, with each file cabinet having at least one file drawer with the basic elements noted above.

The use of two or more crystals in the r.f. circuits greatly expands the potential object population of the system without sacrificing any of the advantages inherent in the known single crystal system. In addition, the need for custom manufactured crystals inherent in a single crystal system with a potentially large object population is eliminated.

For a fuller understanding of the nature and advantages of the invention, reference should be made to the ensuing detailed description taken in conjunction with the accompanying drawings.

DETAILED DESCRIPTION OF THE PREFERRED EMBODIMENTS

The invention has wide application to a large variety of collective object management systems. The following is a detailed description of one application of the invention in the field of file management systems.

Figure 1:
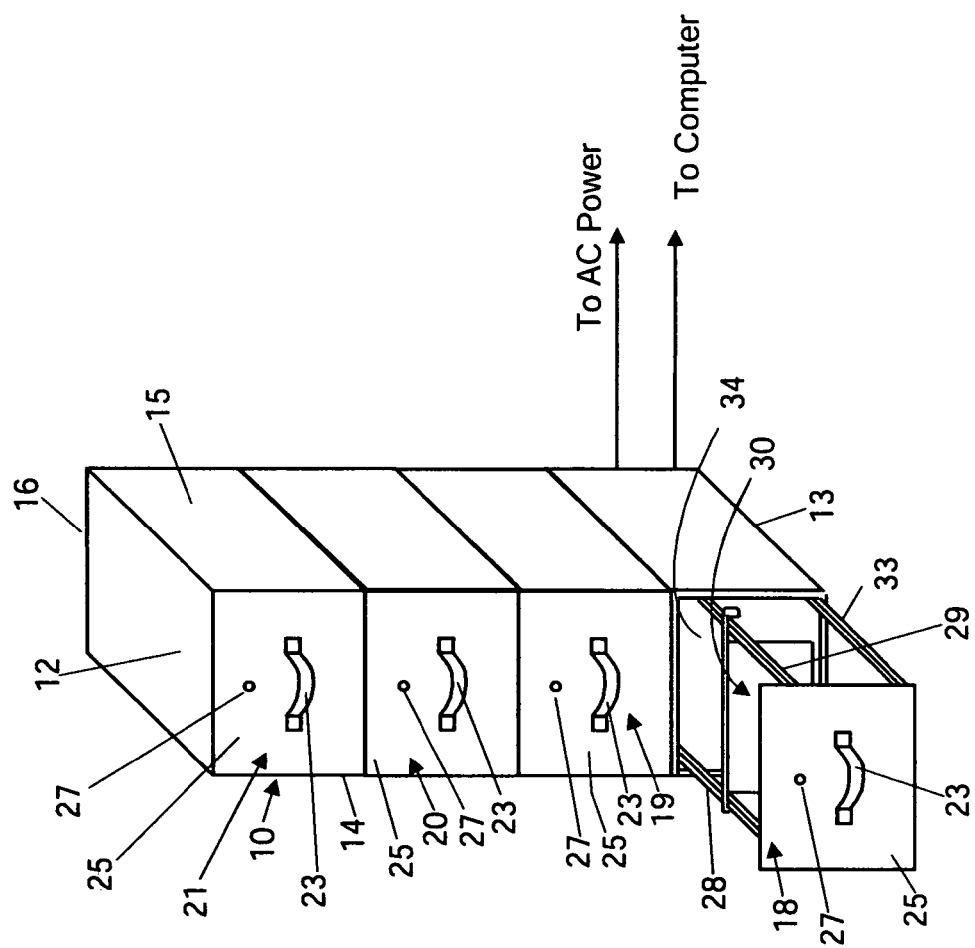
FIG. 1 is a perspective view of a multiple drawer file cabinet illustrating a first embodiment of the invention.

Turning now to the drawings, FIG. 1 is a perspective view, taken from the right front, of a first embodiment of the invention in a file storage system application and using direct electrical connections between the file cabinets and the associated computer. As seen in this Fig., a multiple drawer file cabinet 10 (four drawers illustrated) of known mechanical construction has the usual top 12, bottom 13, sides 14, 15, and back 16. Four drawers 18-21 are slidably mounted in cabinet 10, each drawer 18-21 having a drawer pull 23 mounted on a front panel 25 thereof. A visible indicator device 27 is also mounted on the front panel 25 of each drawer 18-21. Indicator 27 may comprise any one of a number of known elements capable of providing a visible signal when activated in the manner described below. Examples of suitable indicators are a conventional LED indicator, and a type 276-036 flashing LED indicator available from Radio Shack Corporation.

Lowermost drawer 18 is shown in the opened position in order to provide a perspective view of the basic drawer structure and the manner in which a file folder is removably supported in a file drawer. As shown, drawer 18 is provided with a pair of upper support rails 28, 29, which serve the primary purpose of supporting individual file folders, such as file folder 30, in the drawer. Secondarily, rails 28, 29 may also provide structural rigidity for the drawer 18 itself. Drawer 18 also has a pair of lower rails 32, 33 (only one of which is visible in FIG. 1) which complete the horizontal structural elements. In a commonly used file cabinet structure, rails 28, 29, 32, and 33 may form an inner frame insert (along with vertically arranged frame members) which can be physically installed in a standard drawer. To complete the drawer structure, a back 34 is connected to the rails 28, 29, 32, 33. All file folders, such as folder 30, are removably supported by upper rails 28, 29 using horizontal support braces (described below) to which the folder 30 is mechanically secured. The mechanical structure of folder 30 and rails 28, 29 is conventional. The structure and arrangement of drawers 19-21 are identical to that of drawer 18. As indicated by the legended lead lines shown to the lower right of file cabinet 10, an A.C. power connection provides A.C. electrical power to the electronic components described below and located within file cabinet 10. Similarly, a hard-wired connection is coupled between file cabinet 10 and an associated system computer for the purposes described below.

Figure 2:
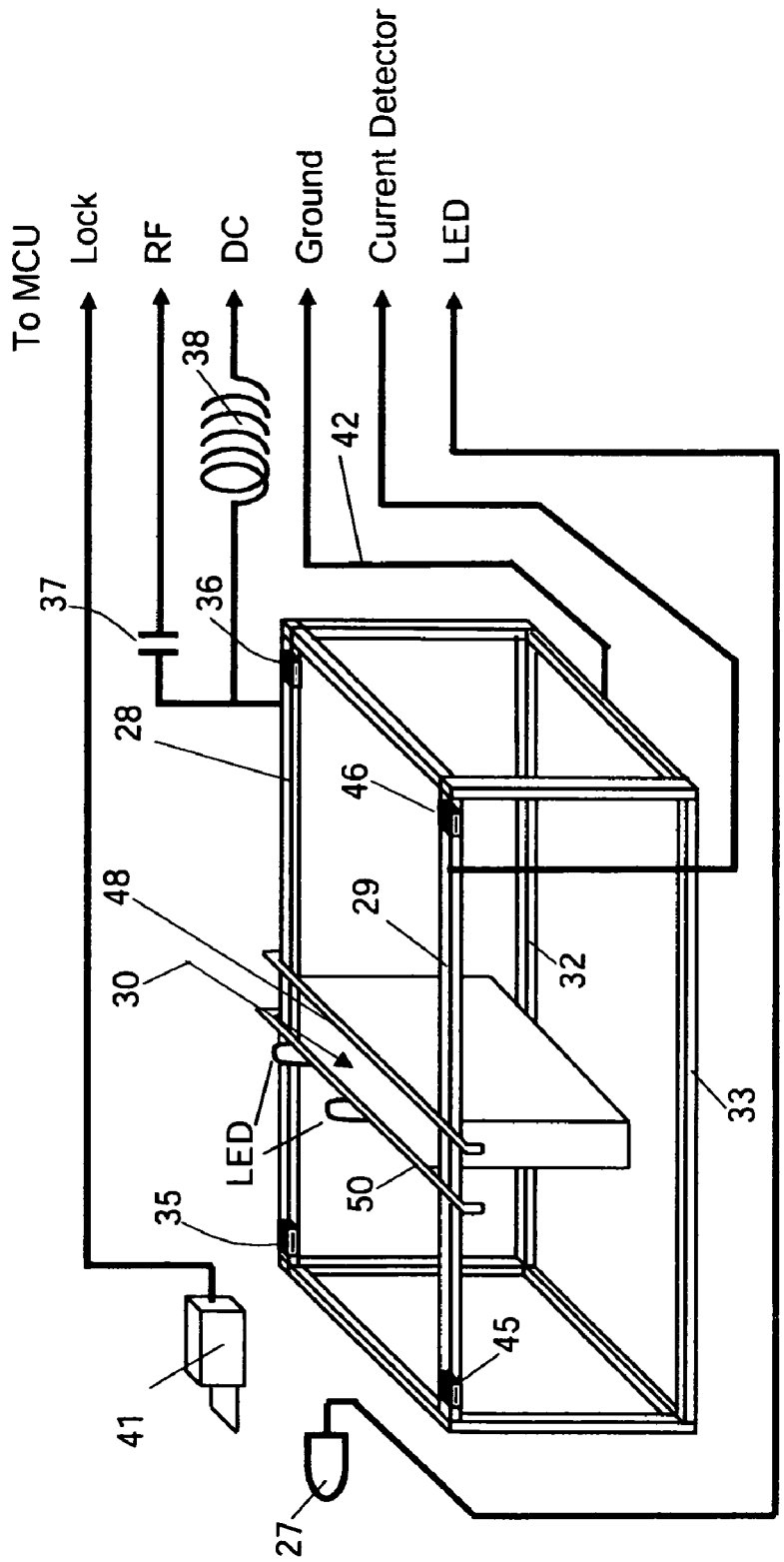
FIG. 2 is a schematic side perspective view of a single file drawer and file folder according to the invention.

As best shown in FIG. 2, upper support rail 28 of each drawer 18-21 is electrically isolated from the remaining drawer frame structure by means of insulating elements 35, 36, and is electrically connected to a local R.F. source (described below) via a capacitor 37, which passes R.F. signals to upper rail 28 but blocks D.C. electrical signals. In addition, upper rail 28 is electrically connected to a local source of D.C. power (described below) via a choke coil 38, which passes D.C. power to upper rail 28 but blocks R.F. signals which might be present. Upper support rail 29 of each drawer 18-21 is electrically isolated from the remaining drawer frame structure by means of insulating elements 45, 46, and is electrically coupled to a drawer current detector 40 shown in FIG. 9, which is positioned in a convenient location in the associated drawer and which detects the passage of D.C. current through a file folder circuit described below. The drawer indicator 27, and an electromechanical drawer lock 41 are electrically connected to an associated microcomputer shown in FIG. 3, along with a ground connection 42.

Figure 3:
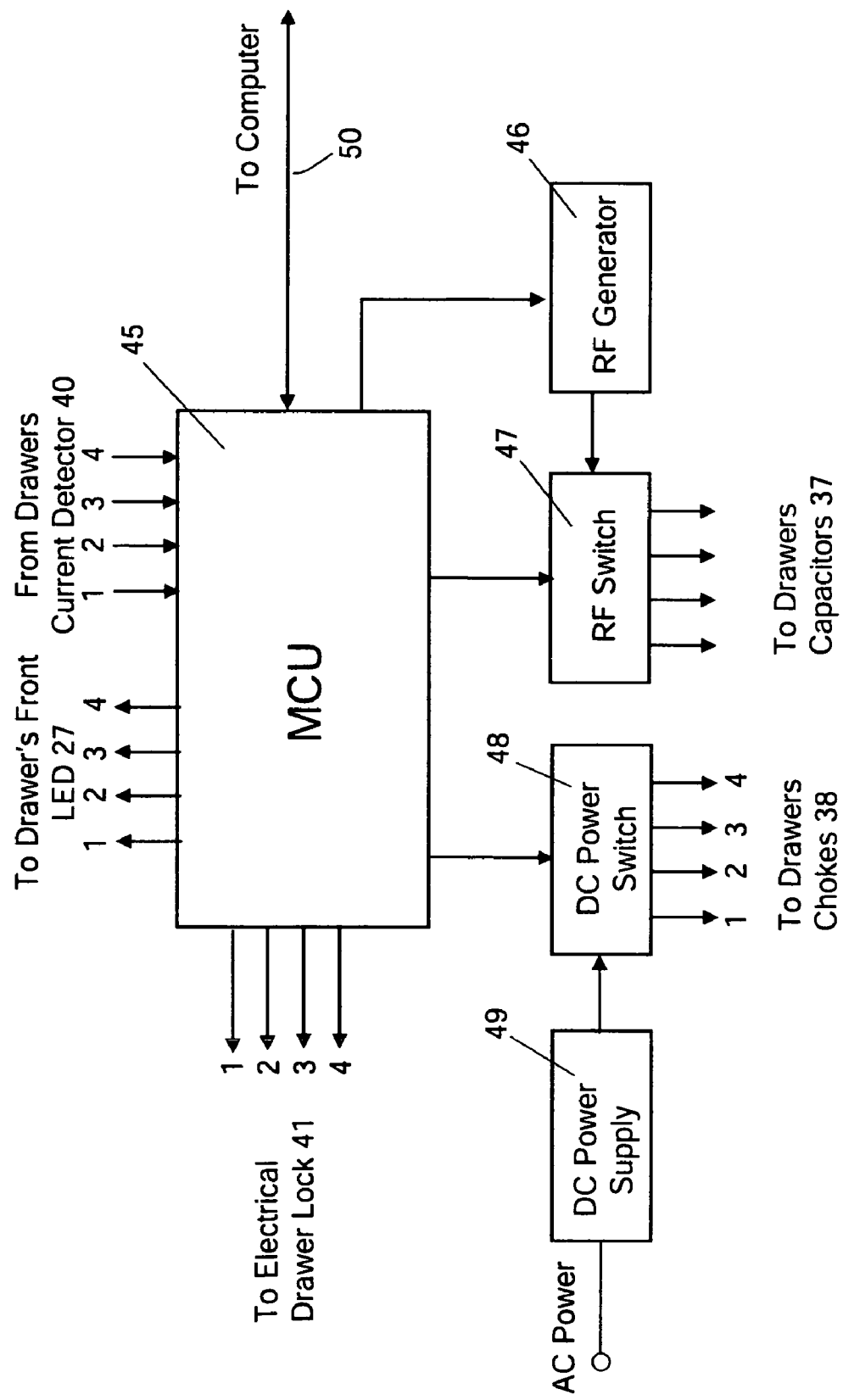
FIG. 3 is a block diagram of an electronic cabinet system located in each file cabinet.

Within each file cabinet 10 is a cabinet system shown in FIG. 3. As seen in this Fig., a microcomputer unit 45, preferably a type AT89C2051 unit available from Intel Corporation, has a plurality (four in the implementation shown) of inputs from the individual drawer current detectors 40 in the associated file cabinet 10. Microcomputer unit 45 supervises and controls the operation of an R.F. generator 46, an R.F. switch 47, and a D.C. power switch 48. R.F. generator 46 is a conventional unit capable of generating an R.F. signal of a specific frequency over a frequency range of interest (e.g., 2-20 mHz) in response to control signals from microcomputer unit 45. R.F. switch 47 is a conventional unit capable of routing R.F. signals from R.F. generator 46 to individual ones of the capacitors 37 connected to the upper rails 28 in the individual drawers of file cabinet 10, as specified by control signals from microcomputer 45. D.C. power switch 48 is a conventional unit capable of supplying D.C. power derived by a D.C. power supply 49 from the A.C. power input supplied to file cabinet 10 to individual ones of the choke coils 38 connected to the upper rails 28 in the individual drawers of file cabinet 10, as specified by control signals from microcomputer unit 45. Microcomputer unit 45 has a plurality (four in the implementation shown) of control signal outputs used to activate the drawer front LEDs of file cabinet 10. Microcomputer unit 45 has another plurality (four in the implementation shown) of control signal outputs used to activate the electrical drawer locks 41 of the individual drawers 18-21 of file cabinet 10.

Microcomputer unit 45 receives information signals from the associated system computer via communication cable 50. These information signals include an identification of a given file being requested.

As seen in FIG. 2, each file folder 30 has the conventional U-shaped cross-sectional construction which has proven to be popular in the office equipment industry for containing documents. Each side (front and back) of folder 30 is mechanically supported by a mechanical brace. One of the braces (brace 48) is of unitary construction and comprises a single rigid electrically non-conductive arm having downwardly folded hook-like ends which slidably engage the support rails 28, 29. The other brace (brace 52) has a special construction according to the invention.

Figure 4:
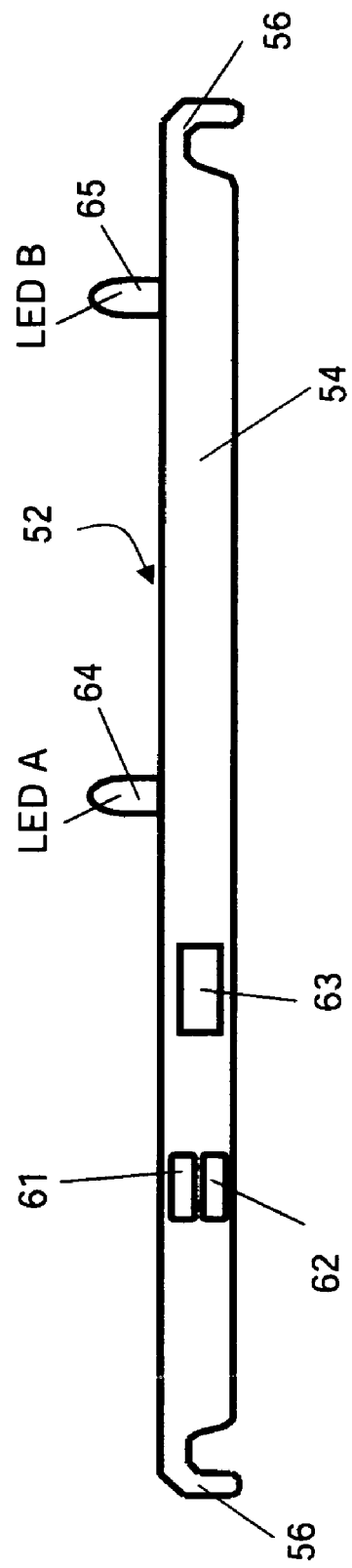
FIG. 4 is a front elevational view of a folder brace bearing the electrical components located at the file folder according to the invention.

With reference to FIG. 4, which is a front elevational view of brace 52, this element includes a main electrically non-conductive support member 54 with a downwardly turned hook-like end 56 at each end which mechanically engages the associated one of rails 28, 29 when the folder is properly positioned in the file drawer. Brace 52 is preferably fabricated from a printed circuit board material on which electrically conductive circuit patterns may be formed and on which circuit components may be mounted. An R.F. responsive electrical circuit comprising a pair of crystals 61, 62, an integrated circuit 63, and a pair of LED indicators 64 (LED A) and 65 (LED B) is mounted on brace 52. The electrical circuit comprising crystals 61, 62, integrated circuit 63, and LED indicators 64, 65 is electrically connected between hook ends 56 of brace 52 preferably by providing conductive paths on brace 52 between the appropriate circuit nodes and the surfaces of hook ends 56 which confront the surfaces of rails 28, 29 when a folder 30 is suspended by the rails 28, 29. LEDs 64, 65 are mechanically supported by brace 52 in such a manner as to protrude above the upper margin of file folder 30 so that both LEDs are visible above the file folder when the file drawer 18 is opened.

Figure 5:
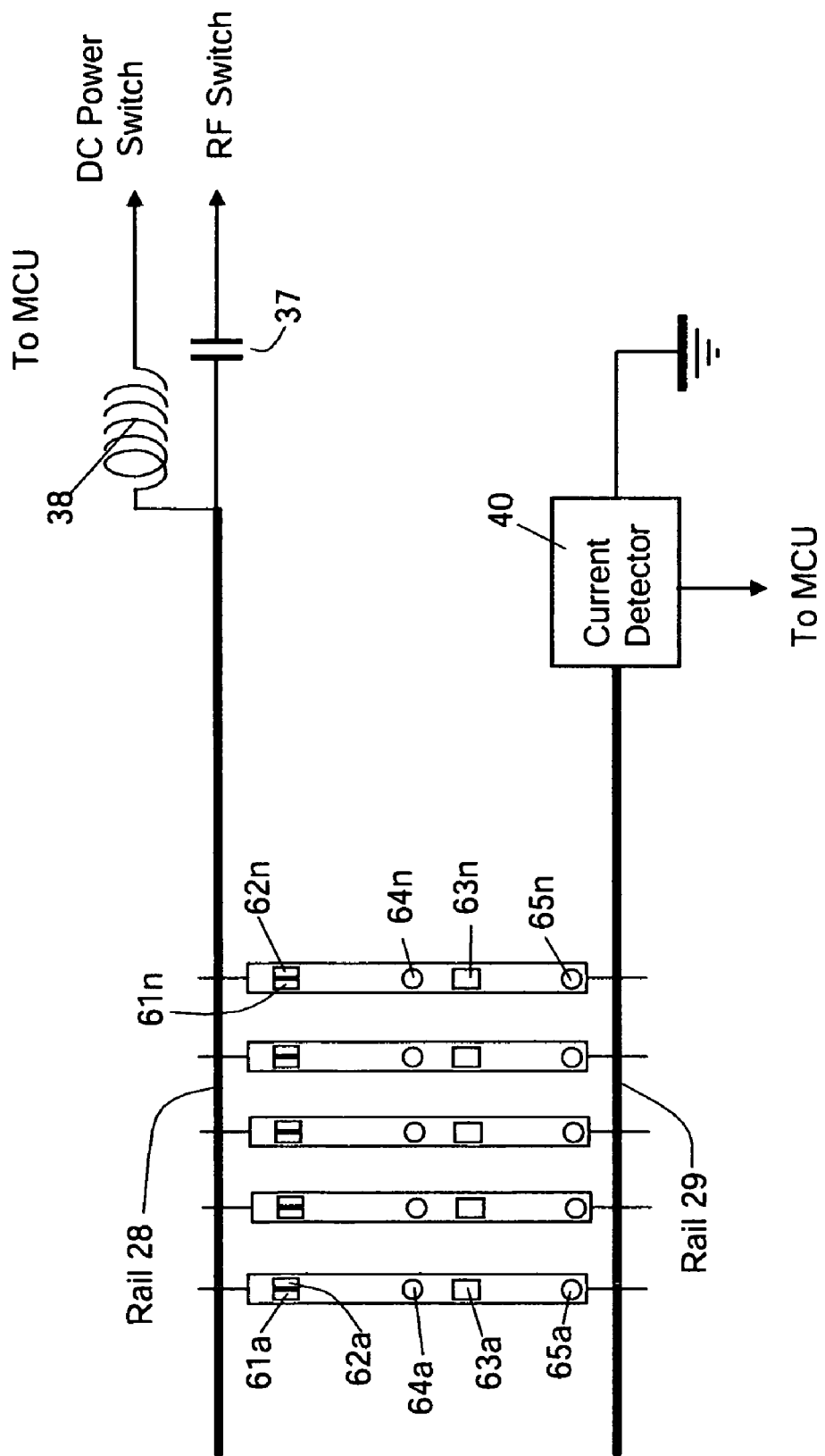
FIG. 5 is a schematic top view showing the manner in which a plurality of folder circuits can be physically arranged in a single file drawer of a file cabinet according to the invention.

FIG. 5 is a schematic top view showing the manner in which a plurality of folder circuits can be physically arranged in a single file drawer. As seen in this Fig., each folder circuit 61i-65i is electrically coupled across conductive support rails 28, 29 with all circuits connected in parallel. Current detector circuit 40 has a first node 76 coupled to rail 29 and a second node 77 coupled to microcomputer unit 45 of FIG. 3. Choke coil 38 is coupled between rail 28 and the associated one of the power output terminals of D.C. power switch 48. Capacitor 37 is coupled between rail 28 and the associated one of the R.F. output terminals of R.F. switch 47.

Figure 6:
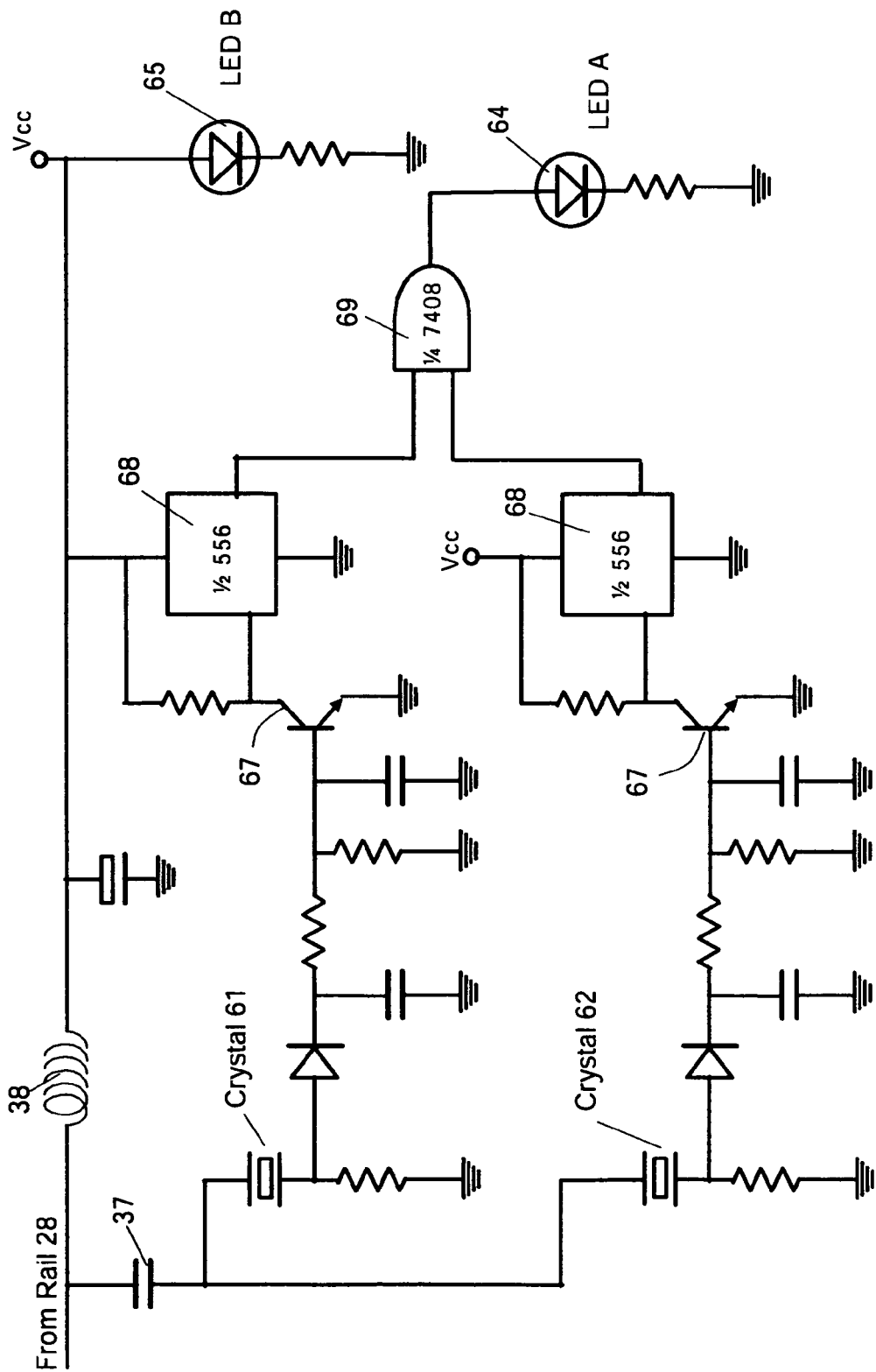
FIG. 6 is a schematic diagram of the folder circuit incorporated into the folder brace 52 of each folder.

FIG. 6 is a schematic diagram of the folder circuit incorporated into the folder brace 52 of each folder. As seen in this Fig., each folder circuit includes a pair of crystals 61, 62 coupled in parallel via capacitor 37 to rail 28 of the associated drawer. Each pair of crystals 61, 62 in a given folder circuit has a combined pair of resonant frequencies different from that of the paired crystals in the other folder circuits. All resonant frequencies are preferably in the R.F. range of the spectrum, and may range in value from about 2 mHz. to about 20 mHz. The frequency separation between crystals is a matter of design choice, and good results have been obtained with crystals in the 2 mHz-20 mHz range by using a minimum frequency separation of 0.001 MHz. When R.F. signals are present on rail 28, they pass through capacitor 37 and are presented in parallel to crystals 61, 62. If the R.F. signals match the frequency of either (or both) of crystals 61, 62, the crystal whose frequency is matched will resonate and present a low resistance to the passage of R.F. current therethrough. This current will switch a transistor 67, which will activate a one-shot circuit 68. If both one-shot circuits 68 are active, their combined outputs will enable an AND gate 69, which in turn will illuminate LED 64 to indicate that the folder has been identified. At the same time, the current detector 40 for the drawer in which the folder is located will illuminate the drawer panel LED 27 in the manner described below.

Figure 7:
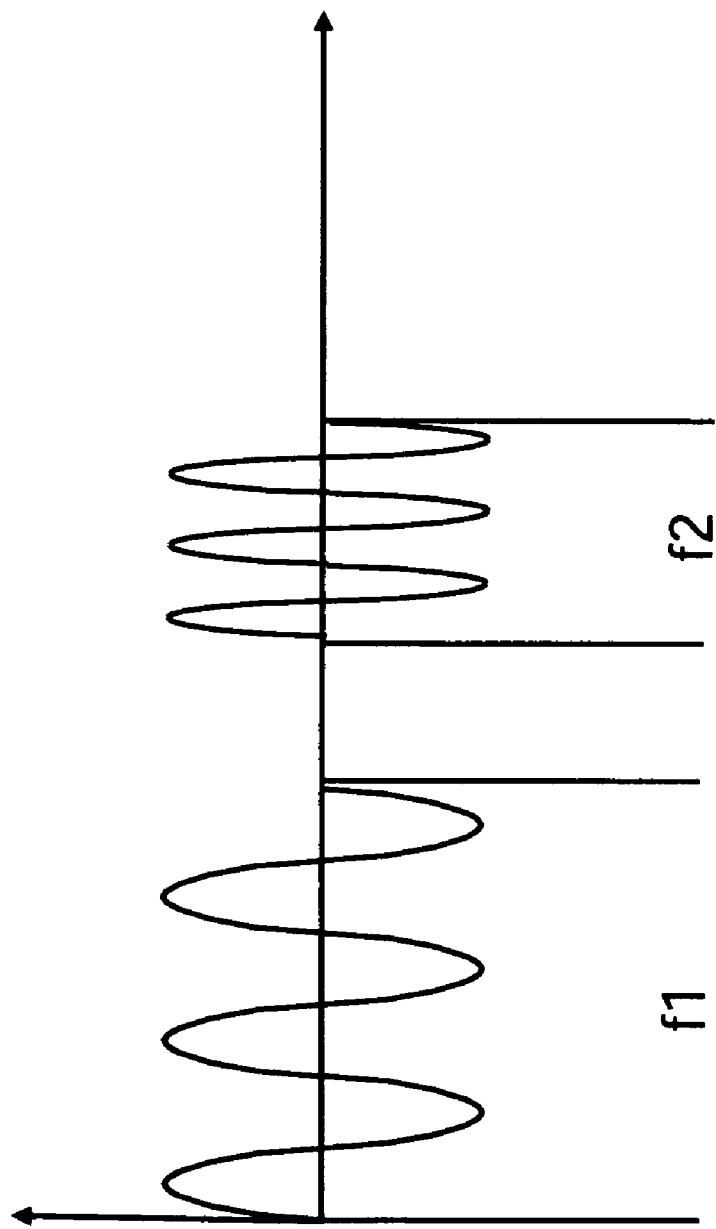
FIG. 7 is an R.F. waveform diagram illustrating the R.F. output signals from a cabinet R.F. generator over one system cycle.

In order to comply with broadcast radiation power constraints imposed by governmental agencies, and to minimize the power requirements of the R.F. generators 46 housed in each file cabinet 10, the preferred technique for generating the R.F. signals is to alternately generate the R.F. signals at the resonant frequencies of the two crystals 61, 62. This is illustrated in FIG. 7. As seen in this Fig., which illustrates the R.F. output signals from an R.F. generator 46 over one system cycle, the R.F. generator first generates an R.F. signal of frequency f1 for a number of cycles, terminates that signal for a brief period of time, then generates an R.F. signal of frequency f2 for a number of cycles, and then terminates that signal for a brief period of time. This cyclical operation is repeated for a sufficient length of time to ensure that the operator has sufficient time to locate the correct file cabinet and drawer (by observing the illuminated drawer LED 27 and file folder LED 64). LED 64 of the correct folder circuit will remain illuminated so long as there exists an overlap between the processed R.F. signals passing through crystals 61, 62. Drawer LED 27 will remain illuminated so long as current is passing through one of the folder circuits caused by resonance of the crystals 61, 62.

Figure 8:
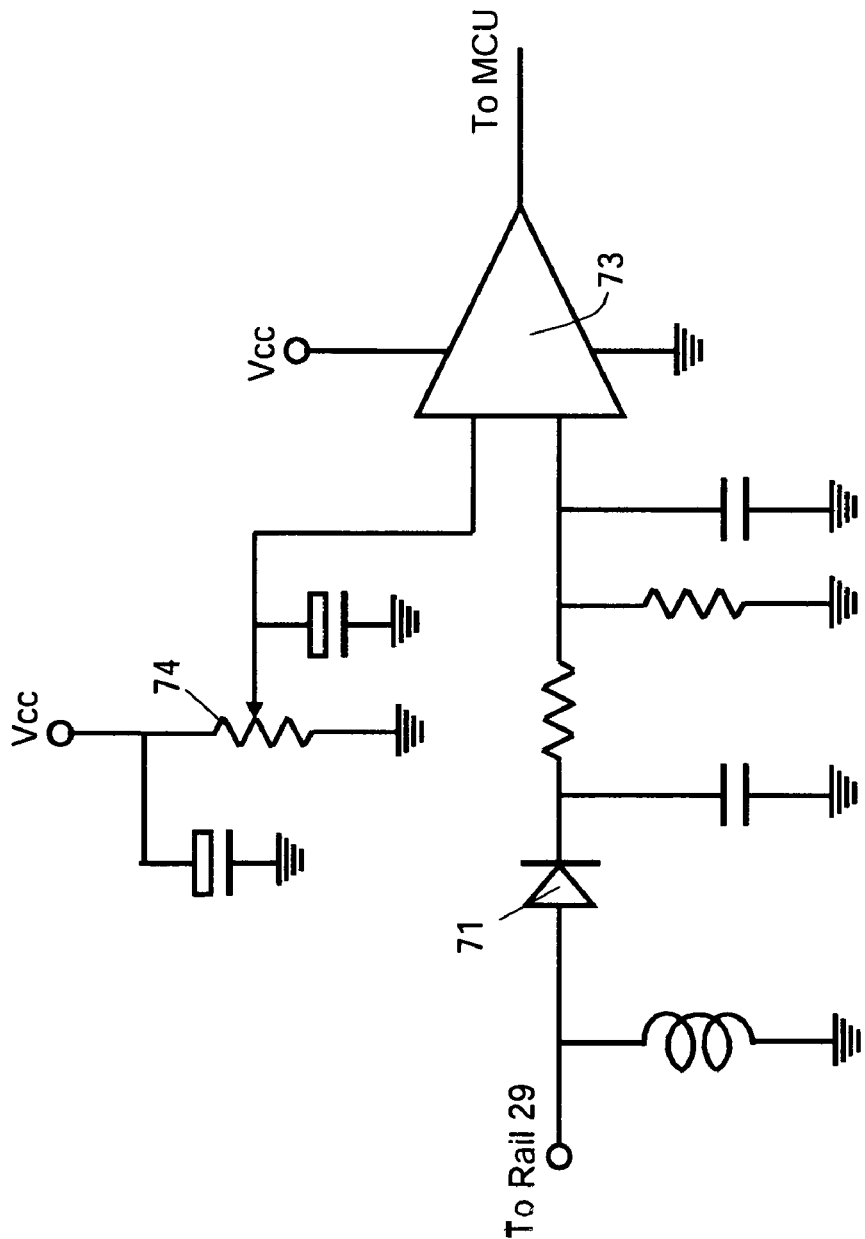
FIG. 8 is a schematic diagram of current detector for each drawer in a file cabinet.

FIG. 8 is a schematic diagram of current detector 40 for each drawer in a file cabinet 10. As seen in this Fig., D.C. current flowing along rail 29 is coupled via a diode 71 and a filter network to a first reference input of an operational amplifier 73. A reference threshold D.C. value is supplied to the other reference input of operational amplifier 73. The value of the D.C. reference voltage can be adjusted by varying the resistance of a variable resistance element 74. So long as one of the folder circuits is active (i.e., the crystals 61, 62 are in resonance), there will be sufficient current present on rail 29 to generate an active signal at the output of operational amplifier 73. This signal is coupled to microcomputer unit 45, which in response generates enabling signals to illuminate the correct drawer front LED 27 and to activate the correct drawer lock 41.

To find a file folder in the system, the operator enters the basic file information into the associated system computer, which contains a complete list of file folders and the file cabinet in which each folder is located. The associated system computer transmits a file folder request to the microcomputer unit 45 in the correct file cabinet 10, and the corresponding microcomputer unit 45 activates the file cabinet R.F. signal generator 46 and R.F. switch 47 to supply R.F. signals of the appropriate R.F. frequency pair to the drawer in which the sought file folder should be located, along with D.C. power. If the sought file folder is actually located in the proper drawer, the microcomputer unit 45 receives a feedback signal from the drawer current detector 40 and generates an operating signals for the drawer front LED 27 and the drawer lock 41. When the operator opens the drawer having the illuminated drawer front LED 27, the correct file folder will be indicated by the illuminated file folder LED 64.

The R.F. signal generator in each file cabinet 10 may comprise a sweep frequency generator capable of generating paired R.F. signals in a swept mode, beginning with the first crystal resonant frequency pair in the file management system, and ending with the last crystal resonant frequency pair in the system. With such a signal generator, the integrity of the entire collection of files can be quickly checked by instructing the microcomputer unit 45 in each file cabinet 10 to activate the R.F. signal generator in the sweep mode. As the paired signal frequencies are swept over the entire range, all folder circuits which are present in a given file cabinet 10 will resonate at their respective frequencies and this can be detected by the microcomputer unit 45 in each file cabinet 10 using a conventional R.F. detector circuit. Any missing file will not respond, and this also can be detected by the microcomputer unit 45 in each file cabinet 10 using the same circuit. Any files detected as missing can be reported by a given microcomputer unit 45 in each file cabinet 10 to the system computer 82 and correlated by the system computer 82 to the file identification in the computer 82 by noting the frequencies of the non-responsive folder circuits.

The system may be initially configured in several different ways. The most fundamental way is to place a single file folder 30 into a drawer in a file cabinet 10, cause the cabinet R.F. signal generator 46 to sweep the range of paired frequencies, note the frequencies at which the crystals in that folder resonate, enter those frequency numbers into a list in the microcomputer unit 45 memory, remove the folder, insert another folder, and repeat this process for all folders desired on a serial basis. Once all file folders have been processed, appropriate file folder identification information is transmitted from microcomputer unit 45 of a given file cabinet 10 to the system computer 82. This method works well for a new system with no existing folders and a relatively small number of folders required initially. A more useful technique is to insert a first folder into a drawer, sweep the permitted R.F. frequency pairs, note the resonant frequencies, enter those numbers into a new list; insert a second folder to the drawer without removing the first, sweep the frequency pairs, add the resonant frequencies of the new folder to the list; insert a third folder into the drawer, sweep the frequency pairs, add the resonant frequencies of the third folder to the list; etc. As each new folder is inserted into the drawer, the microcomputer unit 45 has a running list of frequencies already identified and, since each pair of crystal frequencies is unique, there can be no duplications.

Figure 9:
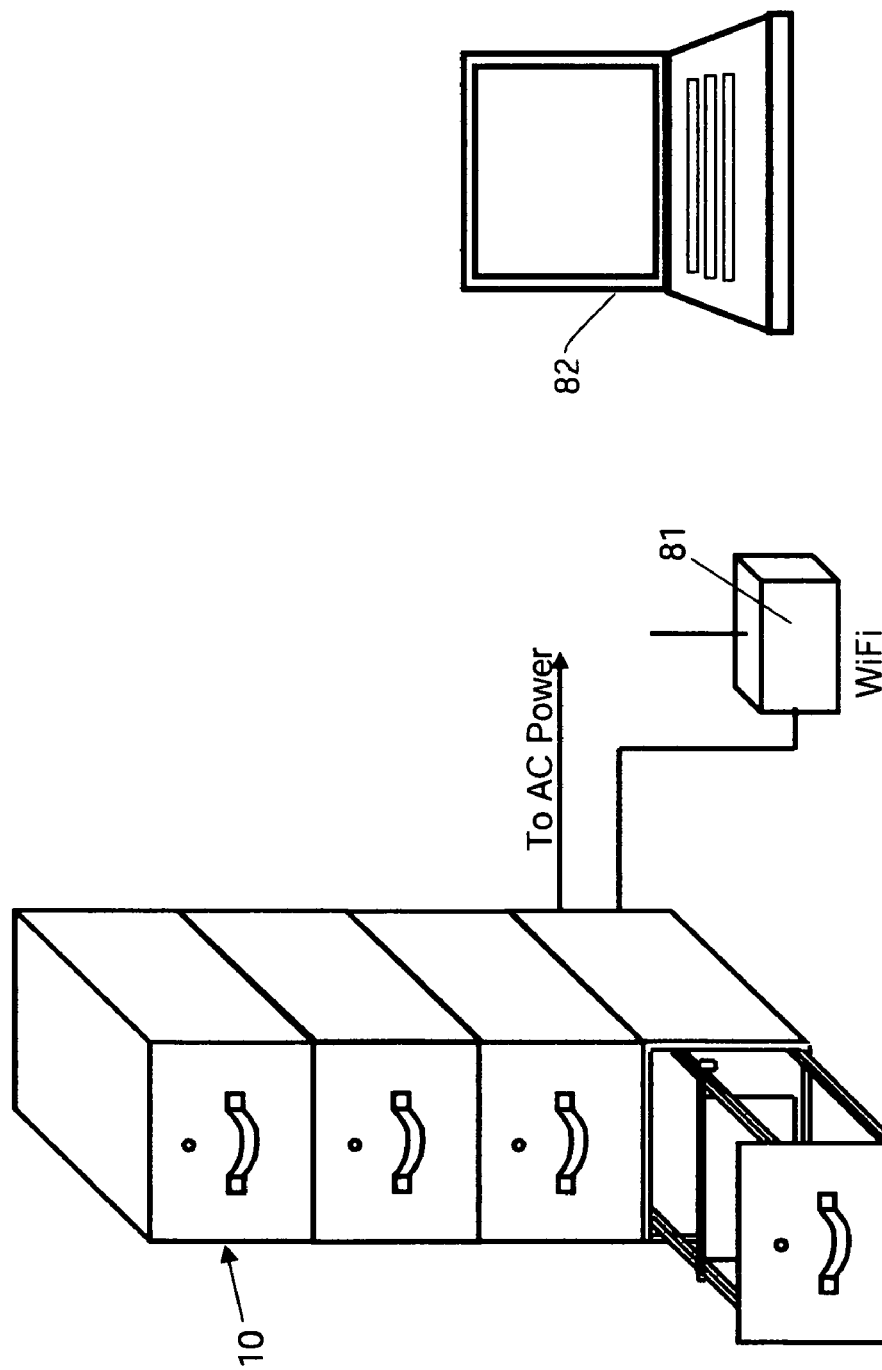
FIG. 9 is a perspective view of a multiple drawer file cabinet in a wireless embodiment of the invention.

FIG. 9 illustrates an alternate embodiment of the file management system implementation of the invention using wireless communication between the individual file cabinets and the associated computer. As seen in this Fig., each cabinet 10 is provided with a transceiver 81 for communication with the associated system computer 82. The associated system computer 82 is provided with a matching internal transceiver. Operation of the FIG. 9 system is essentially identical to that of the FIG. 1 system, with the exception that the folder identification signals are transmitted to file cabinet 10 using wireless transmission, rather that the hard wired connections of the FIG. 1 embodiment. In addition, there may be additional security considerations to the wireless embodiment of FIG. 9 to prevent unauthorized transmission and reception of the R.F. signals.

The invention provides a significant improvement over the single crystal technique disclosed in the above-referenced '875 patent. Firstly, by using paired crystals in each file folder circuit, the total number of individual frequencies required to uniquely identify the collection of folders in a given system is significantly reduced. For example, in order to uniquely identify 20,000 different file folders, slightly less than 200 different paired frequencies are required (as compared to 20,000 individual frequencies required in the single crystal system). Even though twice the number of crystals are needed in systems incorporating the invention (as compared to systems using only a single crystal), the individual crystals can be selected from a stock of premanufactured crystals having standard resonant frequencies (as opposed to crystals which must be custom manufactured to provide a spectrum of resonant frequencies each separated from the others by a fixed frequency separation of 1 kHz), resulting in a substantial overall cost saving. In addition, the invention provides a substantial expansion of the potential object (file folder) population in a given system due to the use of dual crystals in each object (file folder) circuit. Thus, given a system constrained by the available frequency spectrum of choice (e.g., 2 mHz-20 mHz), the invention affords the possibility of accommodating an object population which is several orders of magnitude greater than that afforded by the single crystal technique. Further, the invention affords the advantages noted above without sacrificing any of the advantages inherent in the single crystal system.

Although the above description is devoted to an implementation of the invention in the field of file management systems, the invention has much wider application. In general, the invention can be used in any collective object management system in which the need exists for a technique for rapidly identifying a given class or type of object from a collection of objects. For example, in an automotive parts warehouse operation, the objects may be individual vehicle parts (such as carburetors, alternators, gaskets or the like) stored in bins on shelves. In a manufacturing operation, the objects may be the individual items manufactured in the plant (such as different types of integrated circuits manufactured by an integrated circuits manufacturer) contained in individual packages. In any application, the R.F. circuit and indicator associated to a specific object are closely coupled to the object itself and electrically coupled to a local R.F. generator so that the circuits can respond to the reception of an R.F. signal of the correct frequencies and activate the indicator in such a way that a human operator can locate the object specified by the frequencies.

Although the above provides a full and complete disclosure of the preferred embodiments of the invention, various modifications, alternate constructions and equivalents will occur to those skilled in the art. For example, while the invention has been described with reference to specific R.F. frequencies, other frequencies may be employed, depending on the preferences of the system designer. Moreover, while the indicators 27, 64 have been described as visible indicators, other types of indicators, such as audible indicators, may be used, if desired. In addition, while the invention has been described with reference to a single file cabinet, it is understood that the invention may be implemented using multiple file cabinets positioned at the same or different locations in an office. Further, the invention may be used to manage a file system of many cabinets positioned at different physical locations using an internal or an external computer network, if desired. Lastly, the invention is not limited to the use of two crystals only in each object circuit. Three or more crystals may be used in each object circuit, as desired, primarily to expand even further the total potential object population of a given collective objects management system. Therefore, the above should not be construed as limiting the invention, which is defined by the appended claims.

What is claimed is:

1. A system for managing objects distributed in an object location space, said system comprising:
   a receptacle for a plurality of objects, said receptacle having a pair of electrically conductive members;
   a pair of electrically conductive signal leads coupled to said pair of electrically conductive members; and
   a plurality of radio frequency (r.f.) circuits each associated to a different one of said objects, each of said plurality of r.f. circuits having a pair of electrically conductive terminals in electrical contact with said electrically conductive members when the associated object is located in said receptacle, at least two crystals each resonant at a specific frequency and an indicator activated whenever the associated crystals detect r.f. signals at the specific frequencies of those at least two crystals, the resonant frequencies of said at least two crystals in each r.f. circuit being different from the resonant frequencies of said at least two crystals in the other r.f. circuits so that r.f. signals applied to said pair of electrically conductive signal leads cause said at least two crystals in only one of said r.f. circuits to resonate and only the associated indicator to be activated.

2. The system of claim 1 wherein said indicator is a visible indicator.

3. The system of claim 2 wherein said visible indicator is an LED.

4. The system of claim 1 further including a current detector electrically coupled to said pair of electrically conductive members for detecting resonance of said at least two crystals in any of said r.f. circuits in said receptacle, and an additional indicator coupled to and activated by said current detector for signifying that at least two crystals in one of said r.f. circuits in said receptacle are at resonance.

5. The system of claim 4 wherein said additional indicator is a visible indicator.

6. The system of claim 5 wherein said additional visible indicator is an LED.

7. The system of claim 4 wherein said receptacle has a front panel; and wherein said additional indicator is located on said front panel.

8. The system of claim 1 wherein said receptacle comprises a cabinet file drawer; said pair of electrically conductive members comprise file folder support rails in said drawer; and each of said plurality of r.f. circuits is carried by a different one of a corresponding plurality of file folders, each of said file folders having a pair of electrically conductive support arms arranged to engage said support rails so as to be removably supported thereby.

9. The system of claim 8 wherein each said file folder has an upper margin; and wherein said indicators are located adjacent said upper margin.

10. A system for managing objects distributed in an object location space, said system comprising:
a plurality of receptacles for a plurality of objects, each of said receptacles having a pair of electrically conductive members;
a plurality of pairs of electrically conductive signal leads each coupled to a different one of said plurality of pairs of electrically conductive members, each of said plurality of pairs of electrically conductive signal leads being coupled in parallel to a common signal input terminal; and
a plurality of radio frequency (r.f.) circuits each associated to a different one of said objects, each of said plurality of r.f. circuits having a pair of electrically conductive terminals in electrical contact with one of said plurality of pairs of electrically conductive members when the associated object is located in one of said receptacles, at least two crystals each resonant at a specific frequency and an indicator activated whenever the associated crystals detect r.f. signals at the specific frequencies of those at least two crystals, the resonant frequencies of said at least two crystals in each r.f. circuit being different from the resonant frequencies of said at least two crystals in the other r.f. circuits so that r.f. signals applied to said pair of electrically conductive signal leads cause said at least two crystals in only one of said r.f. circuits to resonate and only the associated indicator to be activated.

11. The system of claim 10 wherein said indicator is a visible indicator.

12. The system of claim 11 wherein said visible indicator is an LED.

13. The system of claim 10 further including a plurality of current detectors each associated to a different one of said plurality of receptacles and each electrically coupled to said pair of electrically conductive members in the associated receptacle for detecting resonance of said at least two crystals in any of said r.f. circuits in said receptacle, and a plurality of additional indicators each coupled to and activated by an associated different one of said plurality of current detectors for signifying that at least two crystals in one of said r.f. circuits in said associated receptacle are at resonance.

14. The system of claim 13 wherein said plurality of additional indicators comprises visible indicators.

15. The system of claim 14 wherein each of said additional visible indicator is an LED.

16. The system of claim 13 wherein each of said receptacles has a front panel; and wherein said additional indicators are located on the front panel of the associated receptacle.

17. The system of claim 10 wherein each of said receptacles comprises a cabinet file drawer; said plurality of pairs of electrically conductive members comprise file folder support rails in said drawer; and each of said plurality of r.f. circuits is carried by a different one of a corresponding plurality of file folders, each of said file folders having a pair of electrically conductive support arms arranged to engage said support rails so as to be removably supported thereby.

18. The system of claim 17 wherein each said file folder has an upper margin; and wherein said indicators are located adjacent said upper margin.

* * * * *

UNITED STATES PATENT AND TRADEMARK OFFICE
CERTIFICATE OF CORRECTION

PATENT NO. : 8,115,629 B2  
APPLICATION NO. : 12/586552  
DATED : February 14, 2012  
INVENTOR(S) : Zhu et al.

Page 1 of 1

It is certified that error appears in the above-identified patent and that said Letters Patent is hereby corrected as shown below:

On the title page, item (75) Inventors, change "Huarg" to --Huang--

On the title page, item (73) Assignee, change "Microdata Corporation" to --iMicrodata Corporation--

Signed and Sealed this
Eighth Day of May, 2012

David J. Kappos
*Director of the United States Patent and Trademark Office*